US012659654B2

(12) United States Patent
Pinter et al.

(10) Patent No.: US 12,659,654 B2
(45) Date of Patent: Jun. 16, 2026

(54) MICROPHONE CIRCUIT FOR THE LINEARIZATION OF THE PROXIMITY EFFECT IN A DYNAMIC DIRECTIONAL MICROPHONE

(71) Applicant: AUSTRIAN AUDIO GMBH, Vienna (AT)

(72) Inventors: Bernhard Pinter, Moosbrunn (AT); Christoph Frank, Baden (AT)

(73) Assignee: AUSTRIAN AUDIO GMBH, Vienna (AT)

( * ) Notice: Subject to any disclaimer, the term of this patent is extended or adjusted under 35 U.S.C. 154(b) by 291 days.

(21) Appl. No.: 17/905,922

(22) PCT Filed: Mar. 5, 2021

(86) PCT No.: PCT/EP2021/055579
§ 371 (c)(1),
(2) Date: Sep. 8, 2022

(87) PCT Pub. No.: WO2021/180583
PCT Pub. Date: Sep. 16, 2021

(65) Prior Publication Data

US 2023/0164484 A1 May 25, 2023

(30) Foreign Application Priority Data

Mar. 10, 2020 (EP) .................................... 20161953

(51) Int. Cl.
*H04R 3/00* (2006.01)
*H04R 1/10* (2026.01)
(Continued)

(52) U.S. Cl.
CPC ............... *H04R 3/00* (2013.01); *H04R 1/326* (2013.01); *H04R 1/1016* (2013.01);
(Continued)

(58) Field of Classification Search
CPC ........ H04R 9/08; H04R 1/2807; H04R 1/283; H04R 25/407; H04R 1/1016;
(Continued)

(56) References Cited

U.S. PATENT DOCUMENTS 2,227,580 A * 1/1941 Harry ....................... H04R 9/08 381/115
4,220,069 A * 9/1980 Fender .................. G10H 3/182 984/369
(Continued)

FOREIGN PATENT DOCUMENTS

DE 4008713 A1 * 9/1991 ............... H04R 1/38
DE 10012519 B4 * 12/2014 ............. H03H 11/08

OTHER PUBLICATIONS

Shure, 55s Multi-Impedance Small Unidyne Microphone (Year: 1951).*

*Primary Examiner* — Carolyn R Edwards
*Assistant Examiner* — Kuassi A Ganmavo
(74) *Attorney, Agent, or Firm* — Raven Patents, LLC; Anton E. Skaugset

(57) ABSTRACT

A microphone circuit characterized in that an impedance element can be connected in parallel with the microphone for the purpose of damping resonance and linearizing the proximity effect. The impedance of this element is preferably between 20 and 1000 ohms.

3 Claims, 6 Drawing Sheets

(51) Int. Cl.
*H04R 1/28* (2006.01)
*H04R 1/32* (2006.01)
*H04R 9/08* (2006.01)
*H04R 25/00* (2006.01)

(52) U.S. Cl.
CPC ............ *H04R 1/2807* (2013.01); *H04R 1/283* (2013.01); *H04R 9/08* (2013.01); *H04R 25/407* (2013.01); *H04R 2205/041* (2013.01)

(58) Field of Classification Search
CPC .......... H04R 2205/041; H04R 2225/51; H04R 3/00; H04R 1/326
See application file for complete search history.

(56) References Cited

U.S. PATENT DOCUMENTS 4,401,859 A * 8/1983 Watson .................. H04R 1/342 381/357
4,420,655 A * 12/1983 Suzuki .................. H04R 3/005 381/94.9
4,817,168 A * 3/1989 Fidi .......................... H04R 1/38 381/357
5,523,526 A * 6/1996 Shattil ...................... H05K 9/00 84/728
6,208,135 B1 * 3/2001 Shattil ...................... H05K 9/00 324/225
6,222,928 B1 * 4/2001 Downs, Jr. ............... H04R 3/00 381/114
6,760,454 B1 * 7/2004 Shreve ................... H04R 1/083 455/88
6,928,174 B1 * 8/2005 Mantysalo ............... H04R 1/04 381/113
9,813,791 B1 11/2017 Cloud
2006/0078152 A1 * 4/2006 Royer .................... H04R 9/048 381/399
2007/0079694 A1 4/2007 Pakzad
2008/0019540 A1 1/2008 van Kats et al.
2010/0104120 A1 * 4/2010 Steinbuss ............... H04R 25/43 381/312
2010/0208929 A1 * 8/2010 Heil ....................... H04R 11/04 381/355
2012/0140972 A1 * 6/2012 Akino ...................... H04R 3/04 381/355
2013/0148836 A1 * 6/2013 Akino ...................... H04R 9/08 381/355
2014/0112515 A1 * 4/2014 Gilbert ..................... H04R 9/08 381/360
2018/0357993 A1 * 12/2018 Baker .................... G10H 3/182
2020/0319844 A1 * 10/2020 Janes ..................... G10K 15/02

* cited by examiner

MICROPHONE CIRCUIT FOR THE LINEARIZATION OF THE PROXIMITY EFFECT IN A DYNAMIC DIRECTIONAL MICROPHONE

TECHNICAL FIELD

The present disclosure relates generally to microphones, and more particularly relates to a microphone circuit for linearizing the proximity effect in a dynamic directional microphone.

BACKGROUND

Dynamic directional microphones are commonly used in both studio recording and live performance. These microphones have the property of delivering different frequency responses depending on whether the sound source is in the near or far field. In the near field, there is higher sound pressure at low frequencies, an effect known as the proximity effect. This proximity effect is often undesirable, since universal microphones, for example, should be able to be used both in the near and in the far field.

Microphone circuits are used in prior art for various purposes, such as the suppression of handling noise or impact noise, or for the purpose of other recording signal adjustments. Generally, an attempt is made to influence the microphone signal as early as possible, ideally immediately after the microphone capsule, in order to keep the total energy in the system low. Possible microphone filter circuits are implemented as active or passive networks or a combination of these in any arrangement. The user has the option of manual control via switches on the microphone.

US 2007079694 A1 discloses a circuit for reducing the acoustic feedback of a microphone. The signal emitted by the microphone is mirrored and calibrated via a resistor so that an offset to the basic signal occurs. The newly acquired signal is then combined (summed) with the basic signal using a mixer. Assuming simultaneity, a linearized output signal is obtained as a result, which should exhibit more stable feedback behavior. In addition, constantly adjusting the signal via a feedback loop is a potential source of errors, since these adjustments are implemented only after the actual microphone in the amplifier circuit. As a result, other interfering factors influence the signal to be corrected and falsify it. Such circuits are also not suited for low frequencies, whereby it is precisely at these frequencies that the proximity effect occurs.

US 20080019540 discloses a circuit for an electret microphone, in which a resistor is connected in parallel with a field effect transistor (FET). The aim is to reduce the voltage between the drain and source of the FET in electret microphones, which are also active microphones. The circuit is an amplifier circuit which is located after the actual microphone capsule. The linearization of the sensitivity is mentioned as a positive effect of the parallel resistor, in accordance with a derived formula and results based thereon. The ratio of dVds/dVgs, which is equivalent to the sensitivity of the electret microphone, can be reduced by linearizing the drain-source voltage by the resistor. This reduces the sensitivity, which reduces the signal-to-noise ratio. Again, this invention gives no indication of ways to reduce the proximity effect.

U.S. Pat. No. 9,813,791 B1 discloses a microphone circuit in which the electrical recording signal is manipulated by switching on a classic high-pass filter, when switching between the two operating states “voice mode” and “music mode,” in order to counteract the proximity effect.

Another possibility known from prior art is the mechanical damping of a microphone capsule, for example by means of nets or damping pads for the microphone diaphragm. Since the proximity effect occurs in a frequency range from 50 Hz to 300 Hz, this solution is fundamentally possible. The disadvantage of this implementation, however, is that due to the purely mechanical nature, the behavior is rigid and offers no possibilities for adaptation to the environment. To make matters worse, the damping components change the directional characteristics of the microphones, which is undesirable.

What is needed, then, is a microphone circuit that can achieve damping of dynamic directional microphones and an associated linearization of the proximity effect without mechanical components.

SUMMARY

The present disclosure includes microphone circuits with a microphone capsule, where the microphone circuit is configured so as to be capable of linearizing a proximity effect in a dynamic directional microphone. The disclosed microphone circuits have at least one inductive impedance element that can be connected in parallel with the microphone capsule.

DETAILED DESCRIPTION

In accordance with technical jargon, the term “impedance element” is often replaced by simply “impedance” in the following and in the claims.

The presently disclosed microphone circuit for a directional microphone has at least one impedance element with inductive properties. The impedance element can be any passive electronic component that is connected in parallel with the microphone capsule and has an effective resistance and an inductive reactance. The value of the impedance connected in parallel is preferably between 20 and 1000 ohms, more preferably between 300 and 700 ohms.

In contrast to classical filters, the impedance element used in the microphone circuits of the present disclosure disproportionately damps the self resonance or quality of the oscillating dynamic microphone system. The shape of the amplitude response of the microphone returns to its original shape on both sides outside its effective range. The self-resonance damping of the oscillating dynamic system in the described application is performed at the electrical level using components that are already present in the system. These components can, for example, be a hum bucking coil, noise suppression coil or EMC components and thus take on a dual function in the system. The value of the parallel connected impedance is also between 20 and 1000 ohms, whereby the active resistance can be small. In this context, small means approximately the ohmic resistance of a commercially available hum bucking coil for dynamic microphones.

Figure 1:
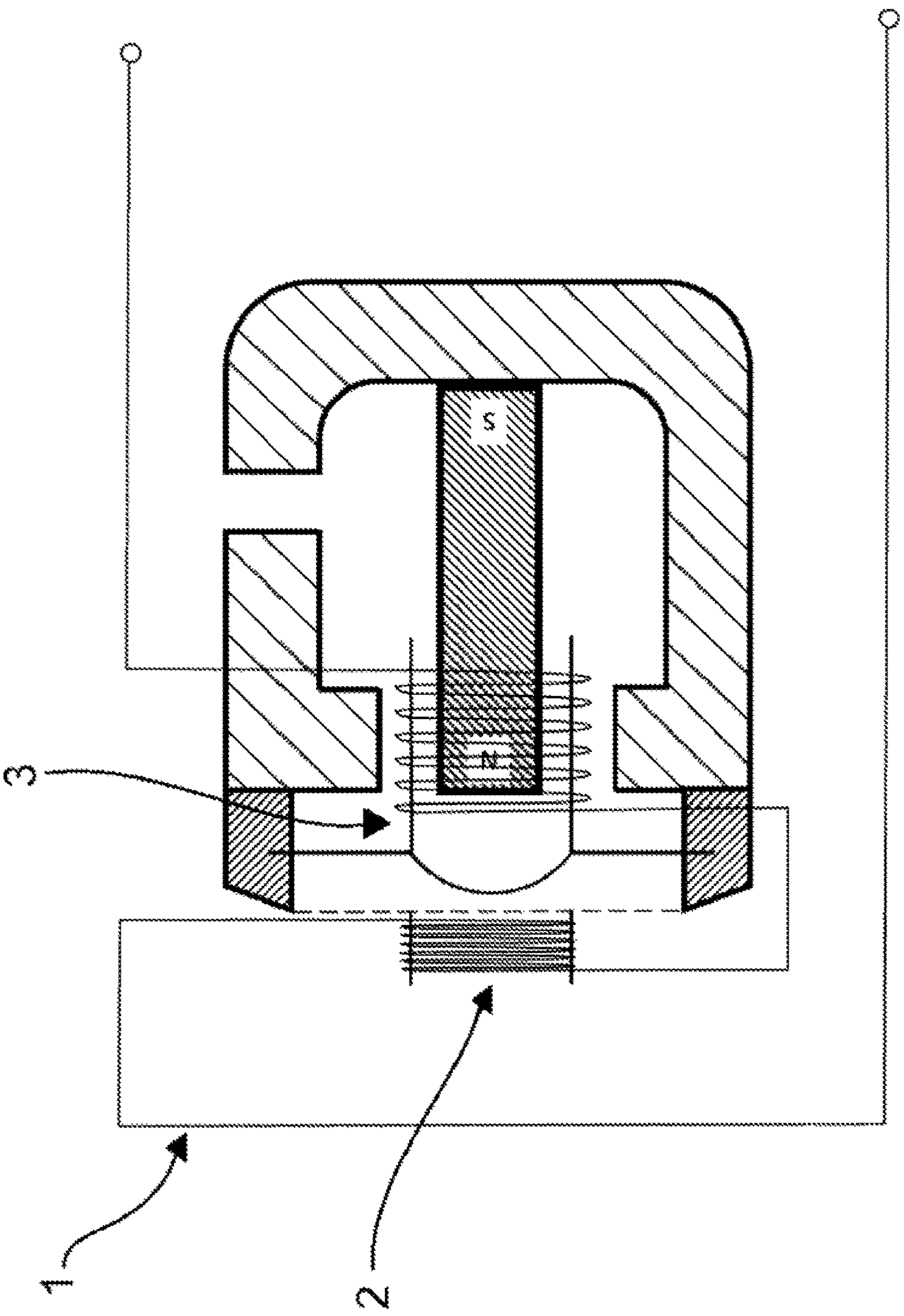
PRIOR ART Fig. 1
FIG. 1 shows a standard version of a circuit for a dynamic microphone with a hum bucking coil.

FIG. 1 shows a standard version of a circuit of a dynamic microphone 1, as is known from prior art, with a hum bucking coil 2 which is connected in series upstream of a moving coil 3. The microphone 1 has no integrated amplifier.

Figure 2:
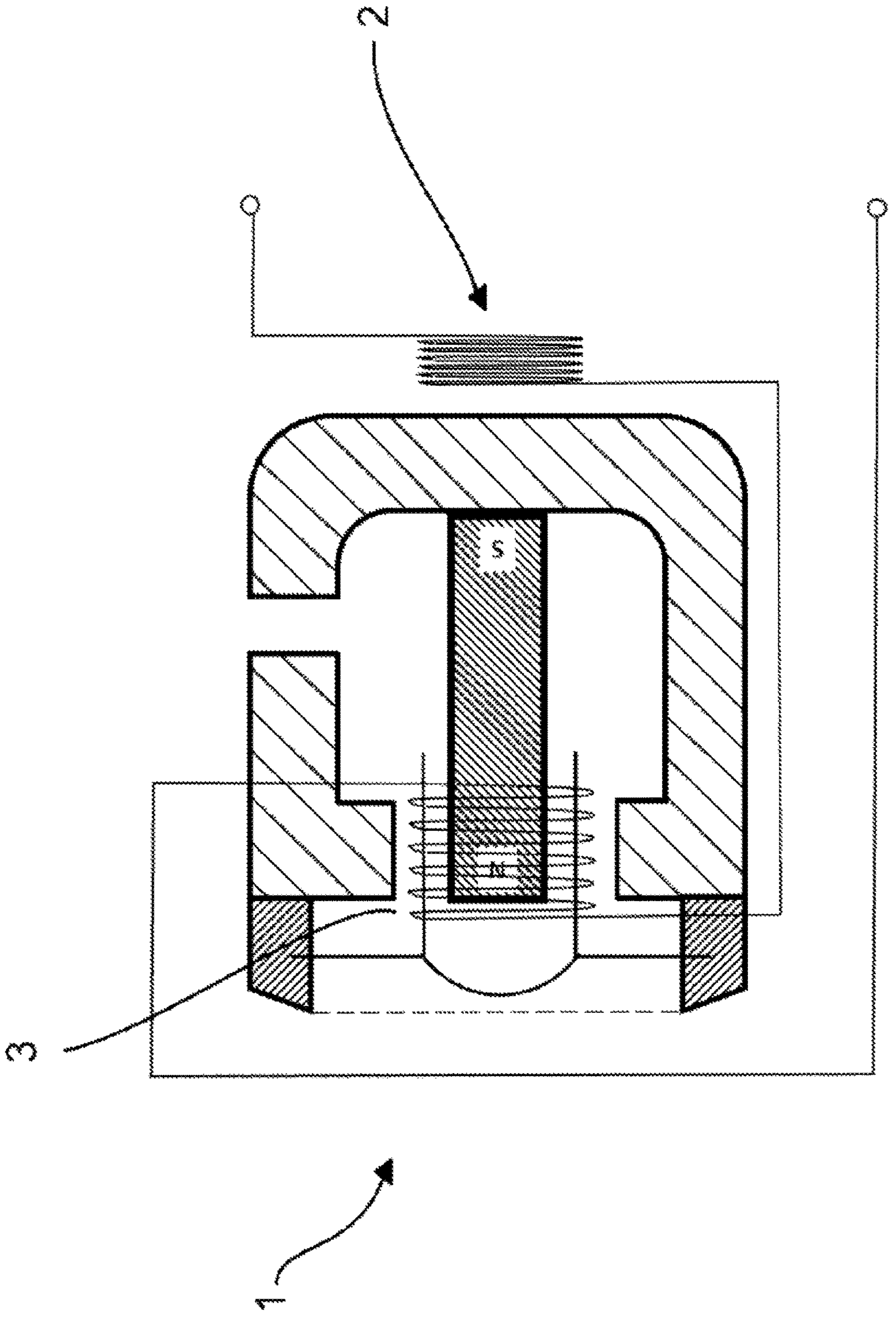
PRIOR ART Fig. 2
FIG. 2 shows another standard version of a circuit for a dynamic microphone with a hum bucking coil.

FIG. 2 shows another standard version of a circuit of a dynamic microphone 1, known from prior art, with a hum bucking coil 2, which is connected in series downstream of a moving coil 3. The microphone 1 has no integrated amplifier.

Figure 3:
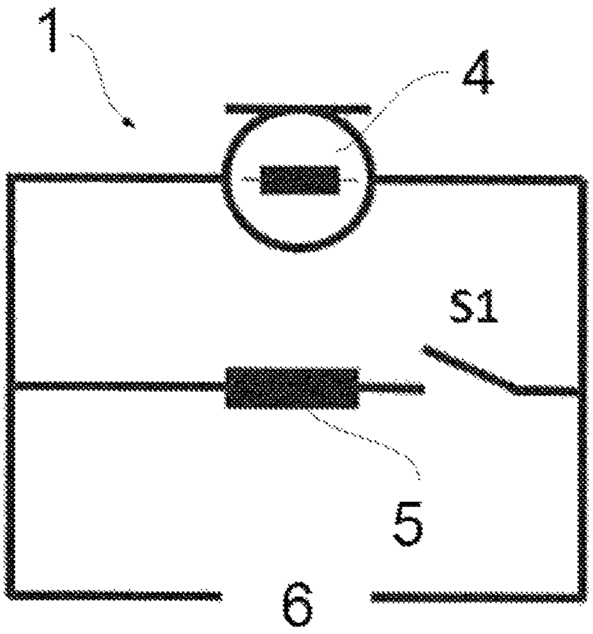
FIG. 3 shows a microphone circuit according to the present disclosure with a microphone capsule and an impedance connected in parallel.

FIG. 3 shows an example of a circuit of a microphone 1 according to the present disclosure, in which a microphone capsule 4 can be connected in parallel with an inductive impedance 5 via a switch S1. For the signal occurring at the signal output 6 and the differences resulting from the circuit states, reference is made to FIG. 7, in which the representation shown, with an open switch S1, corresponds to undamped behavior.

Figure 4:
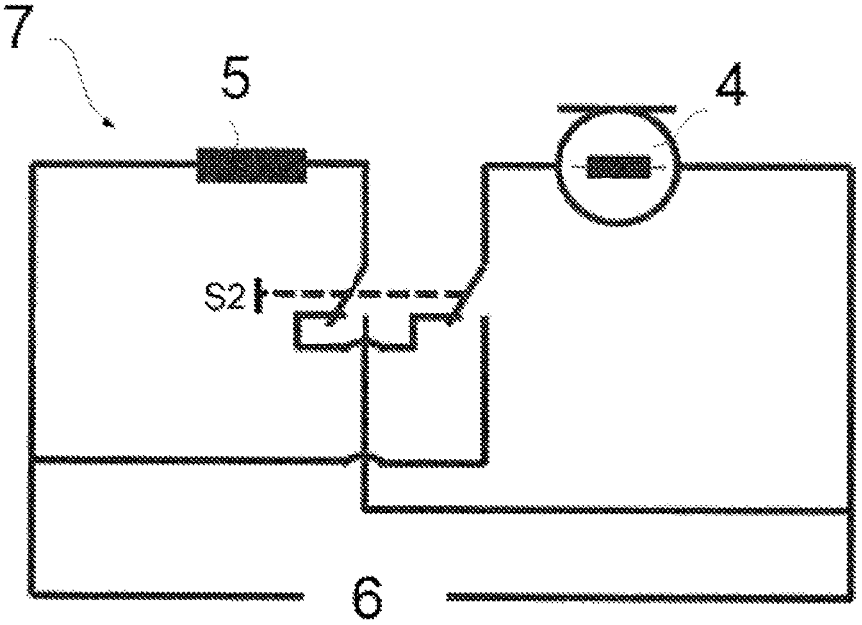
FIG. 4 shows another microphone circuit according to the present disclosure with a microphone capsule and a hum bucking coil or noise suppression coil that can be connected either in series or in parallel.

FIG. 4 shows an example of a circuit of a microphone 7 according to the present disclosure, comprising a microphone capsule 4 and an inductive impedance 5, which can be, for example, a hum bucking coil, a noise suppression coil, or more generally a mechanically oscillating system that dampens mechanical noises (handling noises, impact noise, etc.). This also consists of a membrane/coil system without sound inlet. In the position shown, the impedance 5 and the microphone capsule 4 are connected in series. This position corresponds to the undamped behavior of FIG. 7 at the signal output 6. If the switch S2 is closed, the impedance 5 and the microphone capsule 2 are in parallel connection, which corresponds to the damped behavior of FIG. 7 at the signal output 4.

Figure 5:
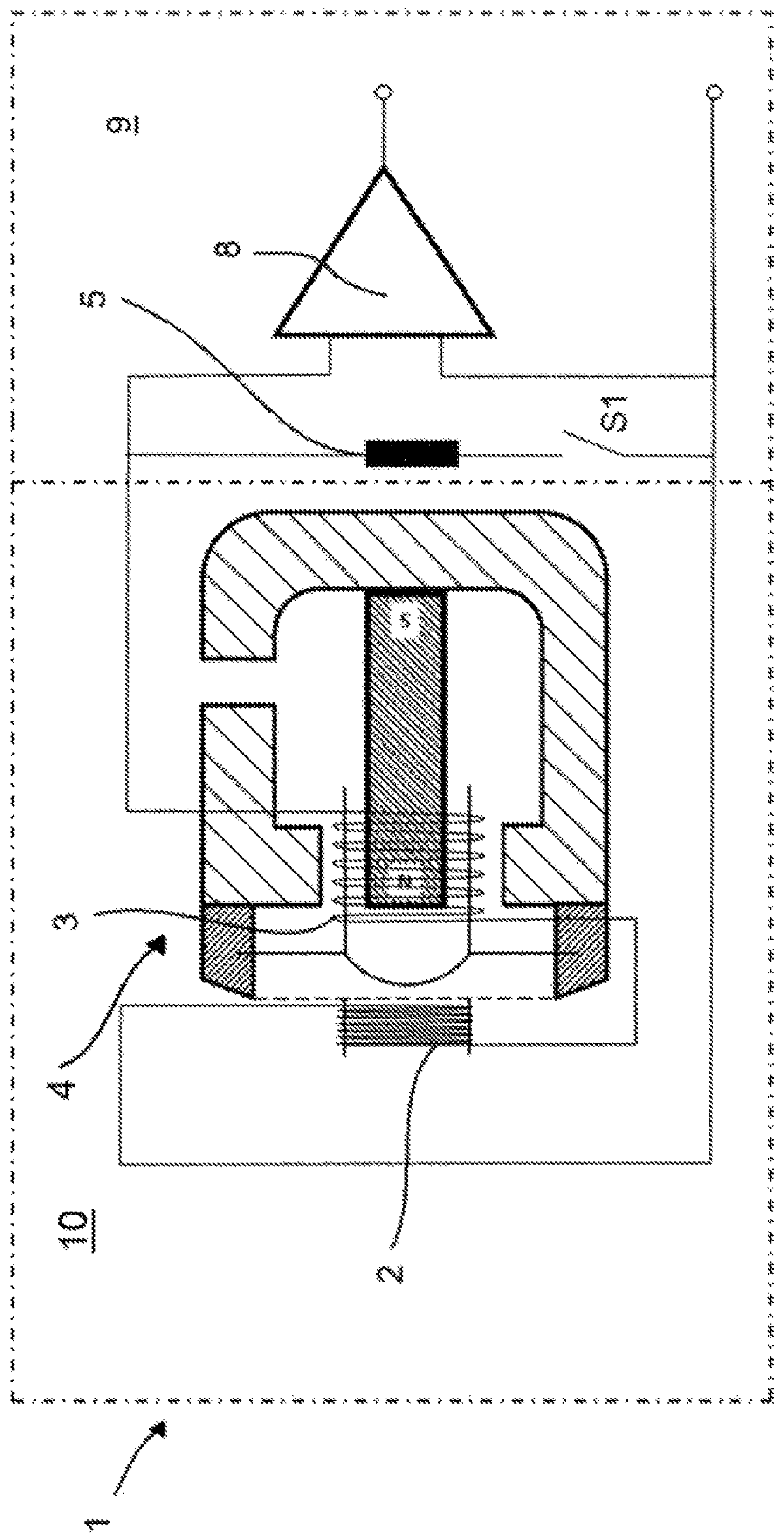
FIG. 5 shows a variant embodiment of a circuit of a dynamic microphone according to the present disclosure according to FIG. 3 and an amplifier.

FIG. 5 shows an exemplary variant embodiment of a circuit of a dynamic microphone 1 according to the present disclosure with a serial hum bucking coil 2 and a downstream inductive impedance element 5 according to FIG. 3. The latter can be switched on and off as required by using switch S1. Downstream of the actual microphone capsule 4 is an amplifier 8 as part of the dynamic microphone. The microphone is divided into an electronic part 9, which contains the amplifier 8 and the parallel impedance 5, and a purely passive mechano-acoustic part 10, which contains the microphone capsule 4 with the separate hum bucking coil 2.

Figure 6:
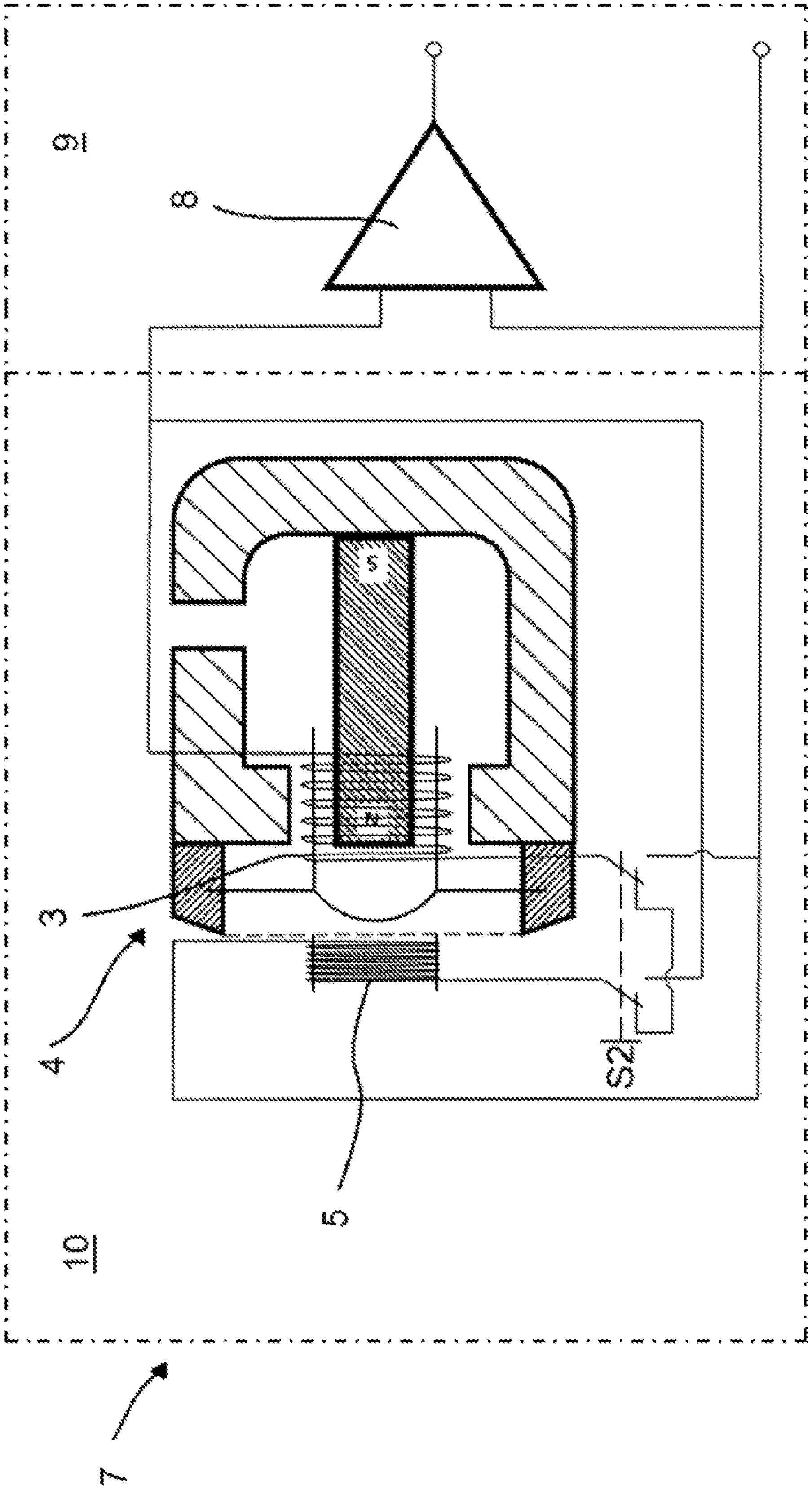
FIG. 6 shows a variant embodiment of a circuit of a dynamic microphone according to the present disclosure with a switchable hum bucking coil according to FIG. 4 and an amplifier.

FIG. 6 shows an exemplary variant embodiment of a circuit of a dynamic microphone 7 according to the present disclosure with a hum bucking coil as a connectable parallel impedance 5 according to FIG. 4. The switch S2 makes it possible to switch from the standard series circuit of the hum bucking coil as a parallel impedance 5 and moving coil 3 to a parallel circuit. Downstream, an amplifier 8 is shown as part of the dynamic microphone. The microphone is made up of an electronic part 9, which contains the amplifier 8 and the switchable parallel impedance 5, and a purely passive mechano-acoustic part 10, which contains the microphone capsule 4 and the hum bucking coil 2.

Figure 7:
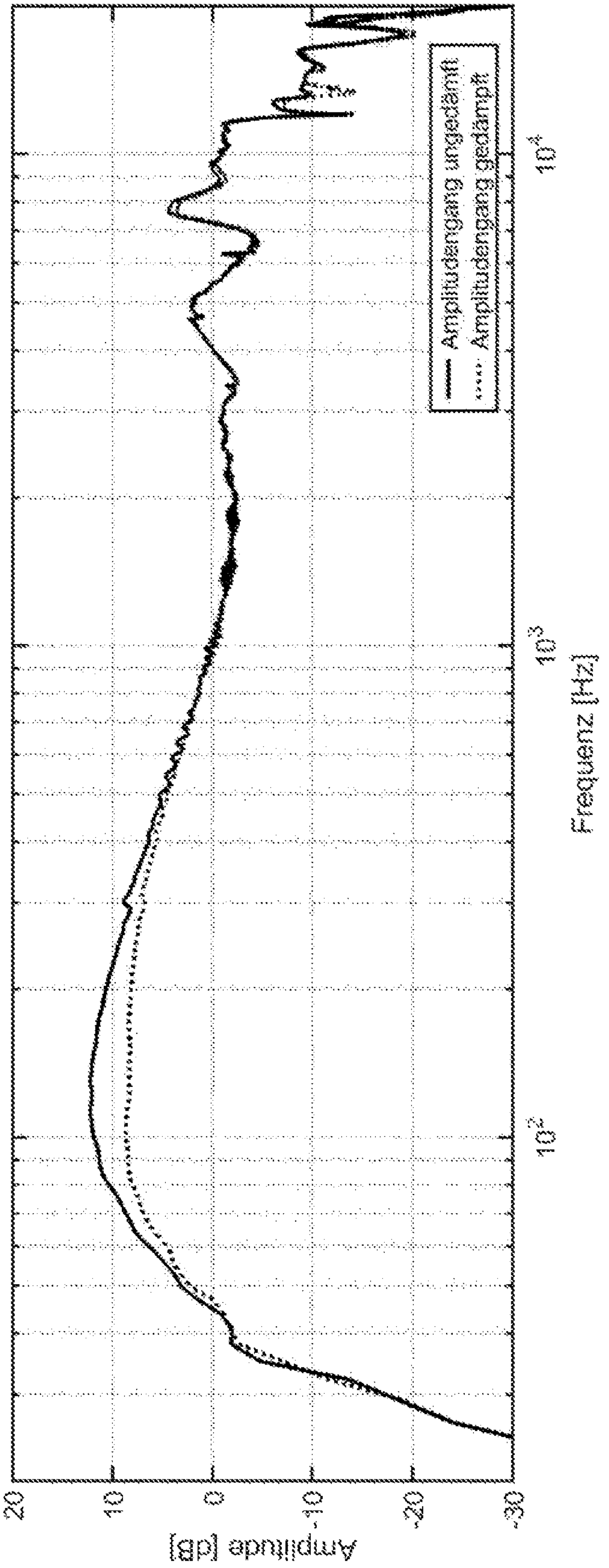
FIG. 7 shows the differences in the amplitude response of an output signal that can be achieved according to the present disclosure, normalized at 1 kHz.

FIG. 7 shows an amplitude response normalized at 1 kHz in each case for an undamped (corresponding to the prior art) and a damped output signal which can be achieved according to the present disclosure for the frequency range from 20 Hz to 20,000 Hz. The amplitude difference between the damped and undamped state for the frequency range 50 Hz-300 Hz can be clearly seen.

If a higher output signal is desired in the relevant frequency range due to the general conditions, the impedance 5 can either be deactivated via the switches S1 and S2, shown in FIG. 3 or FIG. 5 and FIG. 4 or FIG. 6, respectively, or amplified by means of an amplifier 8 to be connected downstream of the output signal.

The embodiments according to the present disclosure shown in FIGS. 3 and 4 and their more detailed representations in FIGS. 5 and 6 are to be understood as examples. Although it is advantageous in most cases if the embodiments have the switches S1 or S2 shown in the figures, in cases where this is not desired for certain reasons, it is of course also possible to have a microphone circuit without the switches S1 or S2. Analogous to FIGS. 3 and 4, this embodiment then corresponds to permanently closed switches.

Examples of inductive impedance elements 5 are hum bucking coils (as shown in FIG. 6), but also noise suppression coils or EMC components. The particular advantage is that these components are often already contained in the microphones, but have been connected in series. These existing components can be connected in parallel with a simple circuit, as shown for example in FIG. 6, and can thus be used to dampen the natural resonance of the microphone. The damping of the natural resonance thus leads to a simple and efficient linearization of the proximity effect.

Measured examples of the ratio of active resistance to reactance of the impedance are:

Example 1: 600 ohm active resistance and 16 ohm reactance, measured at 1 kHz

Example 2: 260 ohm active resistance and 12 ohm reactance, measured at 1 kHz

Example 3: 360 ohm active resistance and 7 ohm reactance, measured at 1 kHz

However, the explanations are not limited to the examples given, but can in principle assume any ratio of reactance to active resistance, provided that it proves to be expedient for reducing the proximity effect in a dynamic directional microphone based on subsequent measurements. Preferably, the range of impedance resistance is in a range of 20 to 1000 ohms, more preferably between 300 and 700 ohms.

A parallel connection is understood to mean the connection of a plurality of reactances and/or active resistances, which have the same voltage direction in the steady state (cf. Deimel et al. "Grundlagen der Elektrotechnik 1", 2000, R. Oldenbourg Verlag, Vienna, p. 82ff. and Deimel et al., "Grundlagen der Elektrotechnik 2", 2001, R. Oldenbourg Verlag, Vienna, p. 86ff.). In contrast, structures with an opposing member are referred to as negative feedback or feedback (cf. Lutz & Wendt, "Taschenbuch der Regeltechnik", 2010, Wissenschaftlicher Verlag Harri Deutsch, Frankfurt am Main, p. 34ff.).

The features and variants specified in the individual configurations and examples can be freely combined with those of the other examples and configurations and used in particular to characterize the invention in the claims without necessarily including the other details of the respective configuration or the respective example.

LIST OF REFERENCE NUMERALS

1 Microphone circuit
2 Hum bucking coil
3 Moving coil
4 Microphone capsule
5 Parallel impedance element
6 Signal output
7 Microphone circuit
8 Amplifier
9 Electronic part of the microphone circuit
10 Mechano-acoustic part of the microphone circuit
S1 Switch
S2 Switch

The invention claimed is:

1. A microphone circuit including a microphone capsule for a dynamic directional microphone, the microphone circuit being configured for linearizing a proximity effect in a dynamic directional microphone;

wherein the microphone circuit has at least one inductive impedance element that can be connected in parallel with the microphone capsule; and wherein the at least one inductive impedance element is a hum bucking coil or noise suppression coil that is connected in series with the microphone capsule of the dynamic directional microphone when in a non-damping state.

2. The microphone circuit according to claim 1, wherein the at least one inductive impedance element is arranged in parallel and can be switched in via a switch.

3. The microphone circuit according to claim 1, wherein an impedance of the at least one inductive impedance element is between 20 and 1000 ohms.

* * * * *